No. 641,066. Patented Jan. 9, 1900.
H. I. & G. W. BARTHOLOMEW.
APPLIANCE FOR MANUFACTURING CEMENT.
(Application filed Oct. 11, 1899.)
(No Model.) 2 Sheets—Sheet 1.
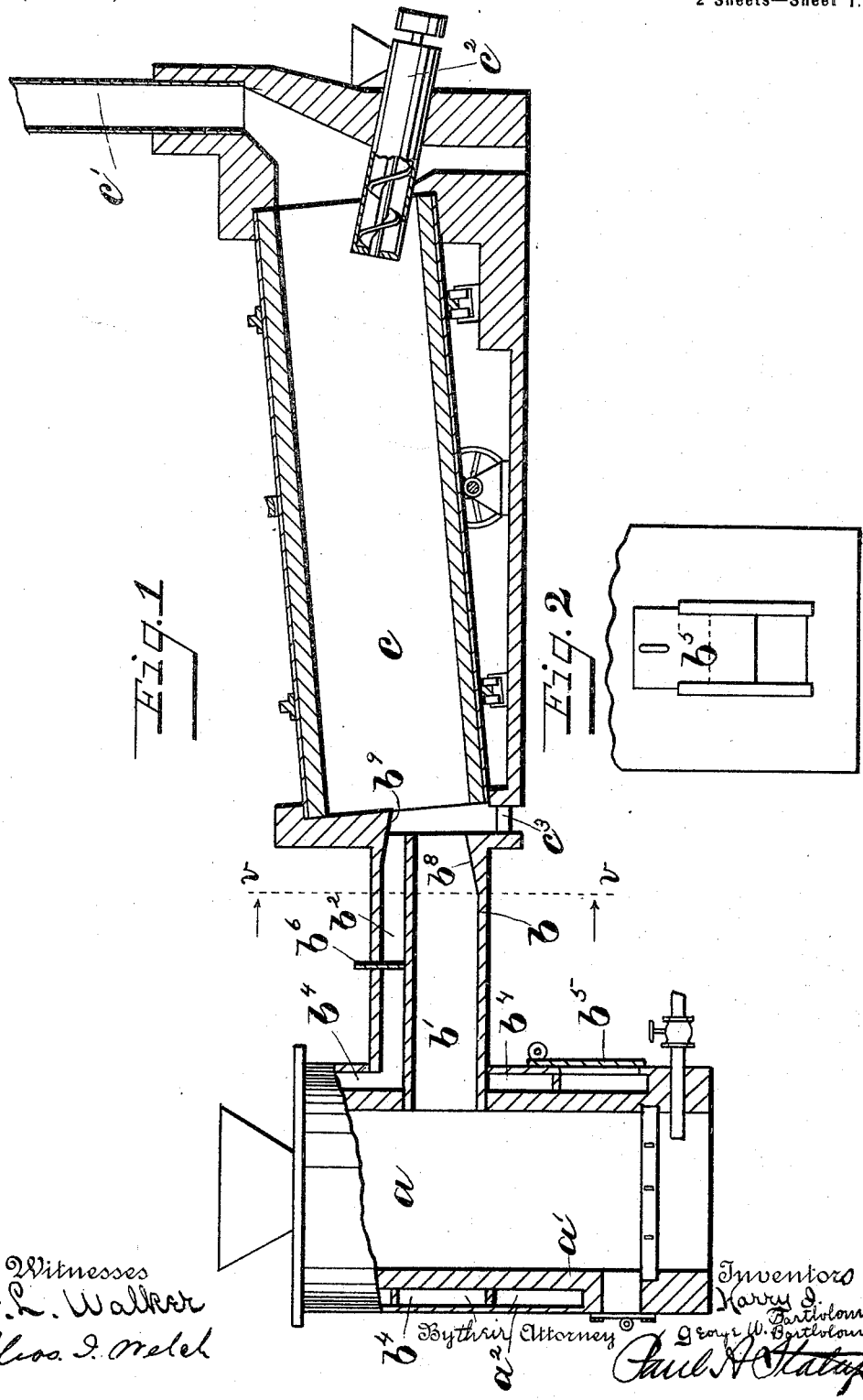

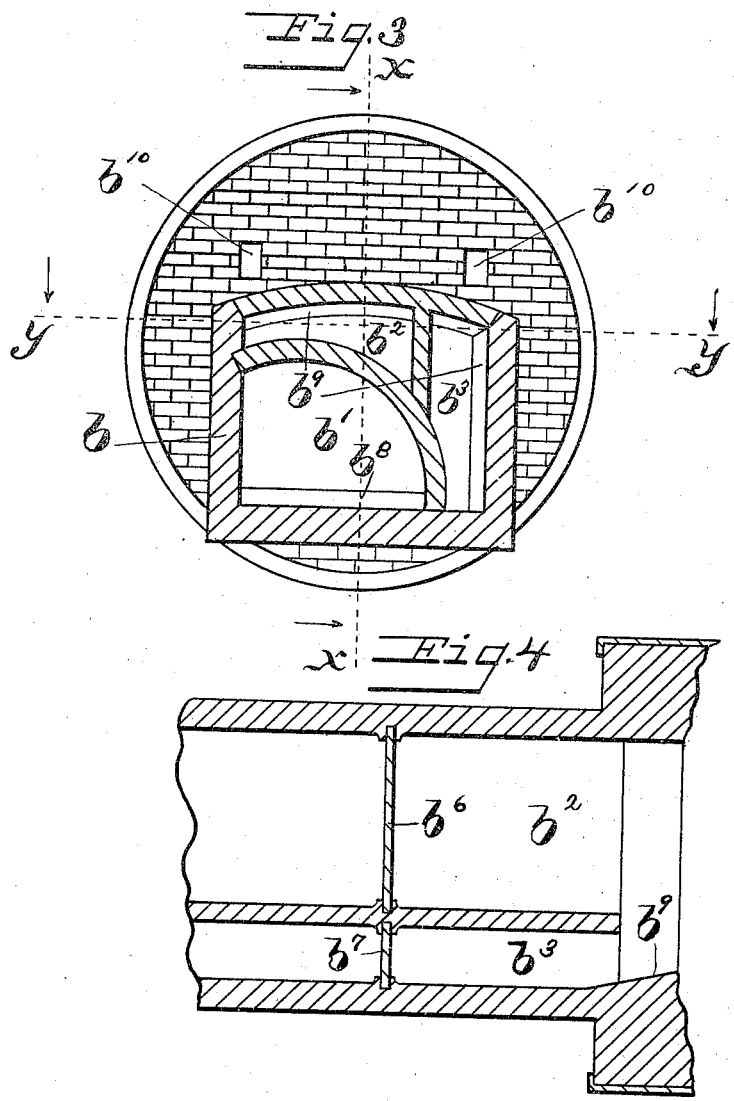

UNITED STATES PATENT OFFICE.

HARRY I. BARTHOLOMEW AND GEORGE W. BARTHOLOMEW, OF BELLEFONTAINE, OHIO, ASSIGNORS TO THE BUCKEYE PORTLAND CEMENT COMPANY, OF SAME PLACE.

APPLIANCE FOR MANUFACTURING CEMENT.

SPECIFICATION forming part of Letters Patent No. 641,066, dated January 9, 1900.

Application filed October 11, 1899. Serial No. 733,332. (No model.)

*To all whom it may concern:*

Be it known that we, HARRY I. BARTHOLOMEW and GEORGE W. BARTHOLOMEW, citizens of the United States, residing at Bellefontaine, in the county of Logan and State of Ohio, have invented certain new and useful Improvements in Appliances for Manufacturing Cement, of which the following is a specification.

Our invention relates to improvements in appliances for manufacturing cement.

In the manufacture of cement, particularly Portland cement, the most common method is to place the materials in kilns in blocks or lumps with the fuel to burn the same, very much the same as lime is ordinarily burned. Attempts have also been made to burn the same in a rotary furnace or cylinder; but difficulties have been encountered in producing a uniform product by reason of the lack of proper appliances for regulating and directing the burning or melting flame or heat to the varying quantities or conditions of the materials fed to the rotary furnace. By our improved construction we have provided means by which the burning of the cement is not only continuous and constant, but a uniform product is secured. We attain this result by the constructions shown in the accompanying drawings, in which—

Figure 1 is a sectional view, somewhat diagrammatic in character, showing the general arrangement and association of the parts employed in our improved device. Fig. 2 is a detailed view of a portion of the same. Fig. 3 is a transverse sectional view of the gas and air conduit, taken on the line V V in Fig. 1. Fig. 4 is a longitudinal sectional view of the same, taken on the line $y\ y$ in Fig. 3, the sectional view of this conduit shown in Fig. 1 being taken on the line $x\ x$ in Fig. 3.

Like parts are represented by similar letters of reference in the similar views.

In the said drawings, $a$ represents an ordinary furnace or producer for producing a combustible gas.

$b$ is a conduit through which the gas is conveyed from the source of supply to a rotary cylindrical furnace $c$. This conduit $b$ has one or more passages $b'$ for the gas and one or more $b^2\ b^3$ for the air. The gas-conduit connects direct with the producer $a$ and receives the gas produced thereby. The air-passages connect, preferably, with a conduit or air-space $b^4$, which surrounds the furnace or producer $a$ and which may, if desired, be formed in the nature of a spiral chamber arranged between the fire-pot $a'$ of the producer and the outer casing $a^2$. The supply of air to this chamber may be controlled by a valve $b^5$, and by this arrangement the air which is admitted to the passages $b^2\ b^3$ is heated. Each of the passages $b^2\ b^3$ is further provided with valves $b^6$ and $b^7$, by means of which the supply of air through the respective passages may be governed. These valves $b^5\ b^6\ b^7$ may be constructed in any suitable manner. In the drawings we have shown the valve $b^5$ consisting of a slide operating in suitable guides or ways, as shown in Fig. 2. The valves $b^6$ and $b^7$, as shown in the drawings, also consist of slides operating in slots in the air-passages.

Each of the passages $b'\ b^2\ b^3$, &c., of the conduit B are formed at their ends with inclined openings, as shown at $b^8$ and $b^9$, so as to deflect the gas and air currents, and, in the manner hereinafter described, thus direct the flame at the point of combustion and at the greatest heat to the particular part of the furnace or against that particular part of the material which it is desired to operate upon. As shown in the drawings, the gas-opening at the end is inclined slightly upwardly, and the air-openings which surround or partially surround the gas-opening are inclined toward the gas-passage.

The material to be acted upon is fed in any suitable manner, preferably by means of the carrier or conveyer $c^2$, to the rear end of the rotating furnace, to stack $c'$ being provided for carrying off the fumes and product of combustion. The furnace is inclined slightly downwardly toward the point where the conduit enters the same, and any suitable means is provided for rotating the furnace.

It should be noted that the front end of the furnace, or the end to which the conduit $b$ leads, is closed except for an outlet $c^3$, through which the finished product is to be discharged.

Sight-openings or peep-holes $b^{10}$ may also be provided by which the process may be observed from time to time.

In operation the rotary furnace revolves slowly. The cement material being fed at the upper rear end works gradually down to the point where the flame resulting from the combustion of the air and gas admitted by the conduit contacts with the same, and at this point it encounters an intense heat and is readily burned. The point at which the flame acts on the material is a few feet away from the point of discharge, and in order that the heat or gases will not come in contact with the cement that is already burned, and, further, in order to provide that the cement shall be properly melted before it passes out of the zone of operation of this melting-flame, it is necessary that the flame be controlled and directed by the operator onto or against that part of the cement material which has not already been operated on or properly burned, and this is done by regulating the supply of air in the different conduits by means of the controlling devices in said conduits. The discharge end of the gas-conduit being inclined upwardly, the flame will naturally be deflected upwardly and pass over that part of the cement which is already properly burned, while the end of the upper air-passage, being inclined downwardly, will have a tendency to deflect the flame down to a point somewhat back of the exit-opening and at the point where the melting should normally take place; but this point of contact or zone of active operation of the melting-flame will be varied by admitting more or less air in the several passages and in this way deflect the flame in either direction, so as to act for a greater or less time at any particular point or against any particular part of the material in order to compensate for the variation in the quantity of the material acted upon.

It is obvious that instead of the gas-producer the gas may be supplied direct from the gas-holder, any suitable pressure being provided in a well-known manner. The air may also be supplied under pressure, if desired, and may be taken either through the producer-furnace or may be taken direct from the atmosphere. Whether taken from the atmosphere or furnace, however, it is preferable that it should be furnished under pressure in a well-known manner in order to give the proper direction to the gas-flame and at the same time supply the necessary oxygen to secure the proper heat to the melting-flame.

It is obvious that these constructions may be varied more or less, those shown in the drawings being those which have been practicably in use. It will be noticed that the air-passages are arranged at the top and one side only of the gas-passage and conduit, the gas-passage being arranged in the lower corner of the conduit, toward which the material will be carried by the rotation of the furnace. It is obvious, however, that these passages may be varied and distributed in any suitable manner to meet different conditions, so long as the air-passages surround or partially surround the gas-passages and are given the proper formation to direct and control the melting-flame.

Having thus described our invention, we claim—

1. In appliances for burning cement, the combination and arrangement of the burning-furnace in connection with an air and gas supply, a conduit for conveying the same to said furnace, the gas-passage being surrounded or partially surrounded by air-passages, each of said passages being furnished with inclined ends or discharge-openings, and means for controlling the quantity of air through the respective passages, substantially as and for the purpose specified.

2. The combination with the rotating furnace, the gas-producer connected thereto by a passage, air-passages surrounding or partially surrounding said gas-passage, said air and gas passages being each provided with inclined discharge-openings and means for controlling the supply of air in said air-passages, substantially as specified.

3. The combination with the inclined rotating furnace, a gas-producer, a passage connecting said gas-producer to said furnace, air-passages adjacent to said gas-passage and surrounding or partly surrounding the same, a heating-chamber in said producer connected to said air passage or passages, said gas and air passages being inclined at their discharge ends, and means for controlling the air passing through said passages so as to control and vary the direction of the burning-flame substantially as and for the purpose specified.

In testimony whereof we have hereunto set our hands this 30th day of September, A. D. 1899.

HARRY I. BARTHOLOMEW.
GEORGE W. BARTHOLOMEW.

Witnesses:
JESSE R. AUSTIN,
HOMER I. ANTRIM.